April 27, 1948.    L. L. JOHNSON    2,440,476
ELECTRIC HEATING SYSTEM FOR A PLURALITY OF OBJECTS,
RESPONSIVE TO TEMPERATURE AND POSITION THEREOF
Filed Nov. 4, 1944
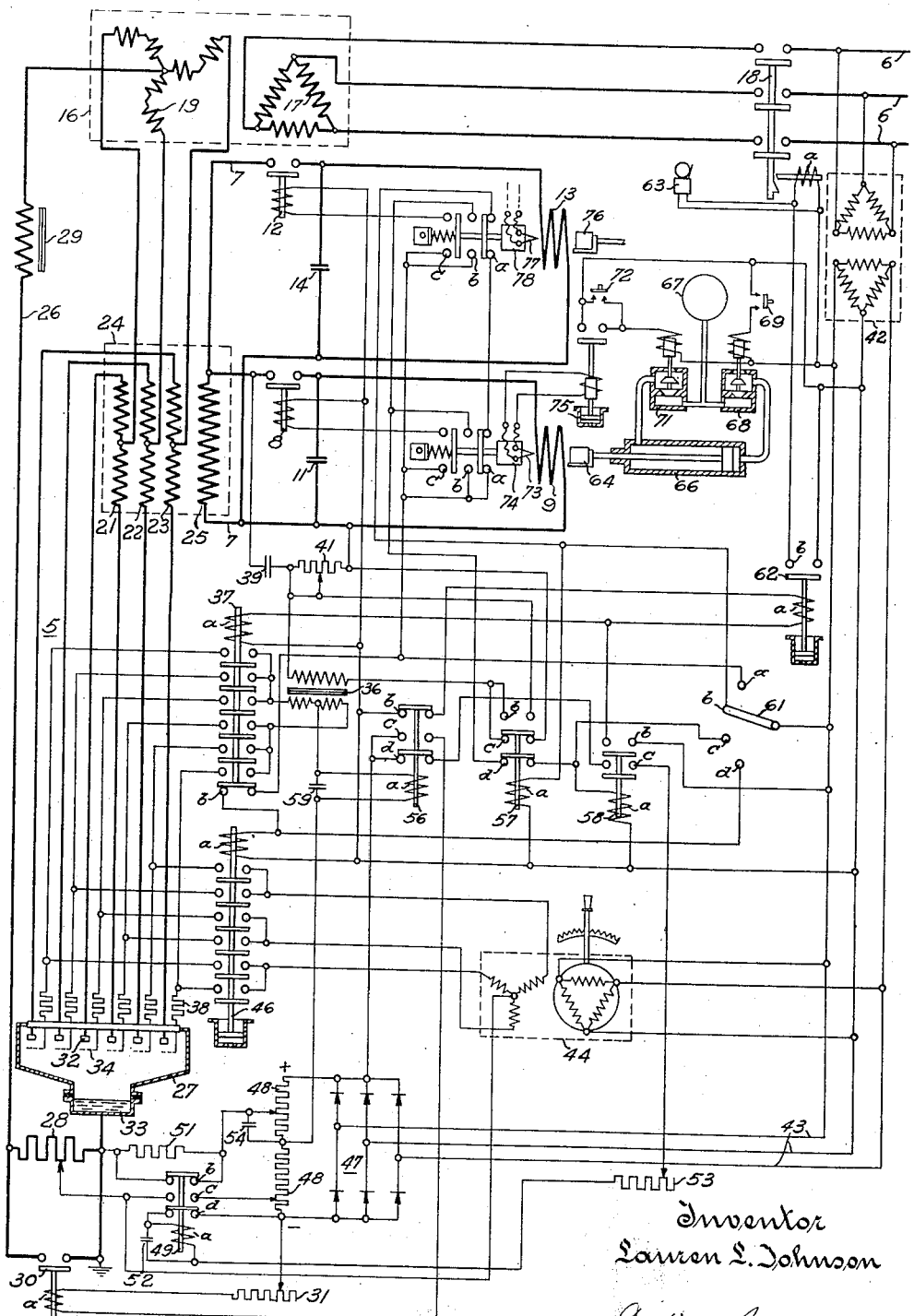
Inventor
Lauren L. Johnson
by Didier Journeaux
Attorney Patented Apr. 27, 1948

2,440,476

UNITED STATES PATENT OFFICE 2,440,476

ELECTRIC HEATING SYSTEM FOR A PLURALITY OF OBJECTS, RESPONSIVE TO TEMPERATURE AND POSITION THEREOF

Lauren L. Johnson, Milwaukee, Wis., assignor to Allis-Chalmers Manufacturing Company, Milwaukee, Wis., a corporation of Delaware Application November 4, 1944, Serial No. 561,951

10 Claims. (Cl. 219—20)

This invention relates in general to improvements in heating systems and particularly to means for controlling the simultaneous heating of a plurality of objects by means of a battery of inductor coils energized from a common current converting system.

When an electric heating system is used for heating a single object it is often advantageous to energize the heating device, which may be a resistor or an inductor coil, from a source of current only when the object is in proper position for heating, and to regulate the supply of current to the device to maintain the object at a predetermined temperature. When several objects are to be heated simultaneously, the supply of current to the heating devices may be controlled automatically in response to positioning of the object to be heated, the source of current being operatively connected to the system when at least one object is in heating position and being operatively disconnected from the system when all the objects are out of heating position. When objects are to be heated by induction from an alternating current source through a frequency converting system, initiation of the converter operation may be controlled by the positioning of the objects to be heated. As different objects heated from the same source do not reach the desired temperature simultaneously, it is advantageous to move each object out of heating relation with the associated heating device in response to the actual temperature of the object.

It is therefore one purpose of the invention to provide a heating system for simultaneously heating a plurality of objects in which the system is rendered operative only when at least one object is in heating position.

Another purpose of the present invention is to provide a heating system for simultaneously heating a plurality of objects in which the system is rendered inoperative only when all the objects are moved out of heating position.

Another purpose of the present invention is to provide a heating system comprising a frequency converting system which is rendered operative when an object is placed in heating position.

Another purpose of the present invention is to provide a heating system in which the relative position of the object to be heated and of the associated heating device is controlled in response to the temperature of the object.

Other purposes and advantages of the invention will be apparent from the following description when read in connection with the accompanying drawing, which diagrammatically illustrates the connections of one embodiment of the invention utilizing a frequency converting system of the electric valve type for supplying heating current to a plurality of inductor coils.

Referring more particularly to the drawing by characters of reference, a converter generally designated 5 is provided for supplying alternating current of relatively high frequency to a single-phase load circuit 7 from a three-phase supply circuit 6 energized from any suitable generator (not shown) operating at a relatively low frequency. It will be understood however that circuits 6 and 7 may be of any numbers of phases and may operate at any desired frequencies according to the current source available and the type of heating load to be connected to circuit 7. Circuit 7 is assumed to be connected through a load switch 8 with an inductor coil 9 and a capacitor 11, and to be similarly connected through a load switch 12 with an inductor coil 13 and a capacitor 14. The number of coils and of capacitors may be greater than two but each capacitor is of sufficient size to overbalance the inductance of the associated inductor coil so that circuit 7 assumes a capacitive character upon closure of a load switch or of any plurality of load switches.

Converter 5 comprises an input or low frequency transformer 16 having a primary winding 17 divided into a plurality of phase portions severally connected with the different conductors of circuit 6 through a switch 18. The secondary winding 19 of transformer 16 is divided into a plurality of phase portions defining a neutral point and so arranged as to substantially preclude dissymmetrical magnetization of the transformer core upon flow of unidirectional currents through the winding.

The terminals of winding 19 are severally connected with the midtaps of primary windings 21, 22 and 23 of an output or high frequency transformer 24 having a secondary winding 25 connected with load circuit 7. The terminals of windings 21, 22 and 23 are connected with the neutral point of winding 19 through a plurality of electric valves 27 of the discontinuously controllable type, an optional resistor 28 and a reactor 29 to complete an intermediate circuit 26 inductively connected with circuits 6 and 7 for the transfer of energy therebetween through windings 17 and 25, respectively. A switch 30, the operation of which may be controlled by a variable resistor 31, serves to short circuit resistor 28 when starting of the converter is completed, but is omitted when circuit 26 is not provided with a resistor.

Valves 27 are provided with anodes 32, which may be assembled each with the associated cathode in a separate casing, or which may all be arranged in a common casing provided with a common cathode 33. The cathode is provided with the usual means (not shown) for initiating and maintaining the emission of electrons thereat. The conductivity of the valves is controlled by means of suitable control electrodes 34 which may be grids when the continuously emissive type of cathode is provided. Grids 34 also serve to control the density of ionization in the space adjacent anodes 32 during the idling periods thereof to prevent failure of the valve action of the anodes. Although only one grid is shown associated with each anode 32, it will be understood that additional grids may be provided, the grids being suitably arranged, dimensioned and energized for further reducing the density of ionization in the vicinity of the anodes. Valves 27, if necessary, may also be provided with suitable external and internal water cooled elements (not shown) for reducing the vapor density within the casing and thereby assist in controlling the density of ionization.

Grids 34 may be energized in two groups of three from a transformer 36 through contacts of a relay 37 and through current limiting resistors 38 of sufficiently low resistance to offer relatively little opposition to the flow of so-called inverse current therethrough resulting from the deionizing action of the grids. Transformer 36 is energized from circuit 7 through a phase shifting circuit comprising a capacitor 39 and an adjustable resistor 41. Grids 34 may alternately be energized in pairs from circuit 6 through a transformer 42, a control circuit 43, a phase shifter 44 and contacts of a time delay relay 46.

A rectifier 47 of any suitable type energized from circuit 43 supplies current to a voltage divider 48. Unidirectional potential components may be impressed on grids 34 from voltage divider 48 and from resistor 28 under the control of a relay 49 cooperating with a resistor 51. The flow of current through the coil 49a of relay 49 is controlled by a capacitor 52 and an adjustable resistor 53. A filter capacitor 54 is connected in parallel with a portion of voltage divider 48.

The starting operation of converter 5 is controlled by means of a plurality of relays 56, 57, 58. The coil 56a of relay 56 is energized by the rectified current of grids 34 during normal operation of the converter and is bridged by a filtering capacitor 59. Different operating conditions of the system may be selected by means of a selector switch 61. A timing relay 62, which is shown conventionally as a dashpot delayed solenoid relay but which may be of any suitable known type, is controlled by the other elements of the system to connect the trip coil 18a of switch 18 and an alarm device 63 with circuit 43 in response to failure of the starting operation of the converter.

Coil 9 is adapted to serve as a heating device for an electrically conductive object such as a billet 64 by induction of electric current therein upon movement of the billet into inductive relation with the coil. The billet may be arranged to be moved in and out of inductive relation with coil 9 by means of any suitable actuator such as a fluid actuated reciprocating motor 66 also serving as a support for the billet. The motor may be connected with a source of fluid under pressure such as a reservoir 67 by means of a magnet valve 68 to cause billet 64 to be placed within coil 9 in heating relation therewith. The coil of magnet valve 68 may be energized from circuit 43 through a push-button switch 69. Motor 66 may also be connected with reservoir 67 through a second magnet valve 71 to withdraw billet 64 out of inductive relation with coil 9. The coil of magnet valve 71 may be energized from circuit 43 through a push-button switch 72.

The relative position of billet 64 and of coil 9 may be controlled in response to the temperature of the billet. More particularly, operation of magnet valve 71 may be controlled in response to the temperature of billet 64 by means of a rigid thermocouple 73 mounted on a yieldable contact making device or relay 74 in such manner that the relay is actuated and the thermocouple is urged into contact with billet 64 in response to the billet being placed in heating position within coil 9. The thermocouple is associated with any suitable known means conventionally represented as a dashpot retarded solenoid relay 75 to cause actuation of magnet valve 71 when the temperature of billet 64 reaches the value for which relay 75 is adjusted and thereby cause relative movement of billet 64 and coil 9 out of inductive relation.

Coil 13 is similarly arranged for effecting the heating of a billet 76 simultaneously with the heating of billet 64 in coil 9 and is associated with a rigid thermocouple 77 mounted on a relay 78. The contacts of relays 74 and 78 and of any other similar relay associated with other inductor coils to be energized from circuit 7 cooperate to control the connection of circuit 7 with the coils and the starting and stopping of converter 5 in response to loading and unloading of circuit 7 by movement of the billets in and out of inductive relation with the inductor coils. It will be understood that the relays may be actuated by the inductor coils if the billets are stationary and the coils are moved instead for relative movement of the billets and the coils in and out of inductive heating relation.

In operation, the elements of the system being in the position shown, energization of circuit 6 causes the supply of current therefrom to coil 57a through transformer 42, circuit 43 and switch 61. Relay 57 operates but such operation is without effect on the operation of the system. Cathode 33 is rendered emissive and is maintained in emissive condition by means of an auxiliary arc as is well known.

Automatic operation of the system is initiated by moving switch 61 into engagement with contact 61a. Current then flows from circuit 43 through switch 61, contact 61a, contacts 74a, contacts 78a, coil 57a, back to circuit 43 to maintain relay 57 in operated position. Current also flows from circuit 43 through switch 61, contact 61a, contacts 37b and coil 46a back to circuit 43, and relay 46 closes its contacts after a predetermined time delay. Current is thereby caused to flow from the secondary winding of phase shifter 44 through contacts of relay 46, resistors 38, grids 34, cathode 33 and a portion of resistor 28 to the secondary neutral point of phase shifter 44. Each grid functions as an anode, and each pair of grids connected with a secondary terminal of phase shifter 44 carries current through a portion of a cycle of the voltage of circuit 6 during which it is at a higher potential than the remaining pairs of grids.

Switch 18 may then be closed to connect transformer 16 with circuit 6. When the transformer is energized, the different phase portions of winding 19 bring the different pairs of anodes connected with windings 21, 22 and 23 sequentially to a potential higher than the potential of the remaining pairs of anodes and of cathode 33. Each anode however can begin to carry current only while the associated grid has a potential more positive than a predetermined critical potential approximating the potential of cathode 33. The variable potential components of the frequency of circuit 6 impressed on grid 34 from phase shifter 44 cause anodes 32 to carry current during variable portions of the voltage cycle of circuit 6. The anode currents therefore flow under variable voltages which may be taken as a measure of the conductivity of valves 27. Phase shifter 44 is so adjusted that each grid becomes more positive than cathode 33 toward the end of the positive half cycle of the potential impressed on the associated anode from winding 19. The different pairs of anodes sequentially carry current impulses which combine at cathode 33 to form a flow of pulsating current through resistor 28 and reactor 29 to the neutral point of winding 19. The adjustment of phase shifter 44 is so effected that the flow of current through valves 27 and intermediate circuit 26 to the exclusion of load circuit 7 is maintained at the proper value for maintaining the temperature of the different elements of valves 27 within the range insuring trouble-free operation of the valves during the conversion of current from circuit 6 to circuit 7.

The connection of the secondary neutral point of phase shifter 44 with the tap of resistor 28 causes the impression on grids 34 of the voltage drop in a portion of resistor 28 to thereby impart to the system a drooping characteristic and thereby limit the flow of current through circuit 26. During this operation each winding 21, 22, 23 serves to balance the currents of the anodes connected therewith without causing the appearance of substantial voltages in winding 25 and circuit 7. While such flow of current may be initiated when valves 27 are at temperatures below their normal operating range this initiation does not involve great difficulties as the transfer of current between anodes at the low frequency of circuit 6 in a current rectifying operation leaves ample time for deionizing the space adjacent each anode at the end of each operating period thereof.

The flow of heating current through valves 27 and intermediate circuit 26 continues as long as circuit 7 remains unloaded. When switch 69 is closed, magnet valve 68 admits fluid under pressure from reservoir 67 to motor 66 and the motor moves billet 64 into inductive heating relation with coil 9. Toward the end of the stroke of motor 66 billet 64 urges thermocouple 73 toward the left, whereby the thermocouple is held in intimate contact with the billet. Relay 74 is thereby actuated to close contacts 74b and 74c. A circuit is thereby established from circuit 43 through switch 61, contact 61a, contacts 74c and the coil of switch 8 back to circuit 43. Switch 8 closes, thereby completing the inductive connection of circuit 7 with billet 64 constituting a load therefor. Relay 74 also opens contacts 74a, thereby deenergizing coil 57a. Relay 57 returns to the position shown and closes a circuit from circuit 43 through switch 61, contact 61a, contacts 74b, contacts 57d and coil 58a back to circuit 43. Relay 58 operates and connects coil 62a with circuit 43 through contacts 58b and 56b.

Relay 58 also connects coil 37a with circuit 43 through contacts 58b. Relay 37 first opens contacts 37b, thereby deenergizing coil 46a. Relay 46 immediately disconnects grids 34 from phase shifter 44. Grids 34 are then no longer impressed with potential and the flow of heating current through valves 27 is accordingly interrupted in response to loading of circuit 7. Relay 37 thereafter connects grids 34 in two groups of three with the secondary terminals of transformer 36, which is then unenergized.

Relay 58 also completes a circuit from rectifier 47 through contacts 56d, contacts 58c, resistor 53, coil 49a and contacts 49d back to the rectifier to energize coil 49a and charge capacitor 52. Relay 49 operates to open contacts 49d, but coil 49a remains momentarily energized by current supplied thereto from capacitor 52. Relay 49 also opens contacts 49b and closes contacts 49c to substitute the voltage drop in a portion of resistor 28 and a positive potential from voltage divider 48 for the negative potential previously impressed on grids 34 from voltage divider 48.

The grids accordingly release the flow of current through all valves 27 and circuit 26 at the full voltage of winding 19 in response to loading of circuit 7. The valves operate sequentially in pairs to carry large pulsating currents which combine at cathode 33 to flow as a pulsating unidirectional current through resistor 28 and reactor 29. The current in circuit 26 however does not reach immediately its steady state value because of the inductance of reactor 29, and its average value increases gradually. The voltage drop produced by the flow of this current in resistor 28 is pulsating and of increasing magnitude, and a portion of this voltage drop is impressed in the negative sense on the circuits of grids 34.

The voltage drop so impressed on grids 34 periodically becomes lower than the positive potential component impressed thereon from voltage divider 48, whereby each valve 27 is rendered conductive only toward the end of the half cycle of the voltage impressed thereon from winding 19, commutation takes place with a considerable discontinuity in the voltage of circuit 26, and the average intensity of the current of circuit 26 is limited to a predetermined value. The flow of current through each valve accordingly takes place in impulses in response to the sudden impression of a positive potential on the grids by operation of relay 49 for rendering the valves conductive and to the transfer of current from one valve to another under an abrupt change in voltage.

While the detailed action of such current impulses has not been observed and is not known, experiments have shown that when the current impulses exceed a magnitude depending on the characteristics of the elements of the system, the impulses result in the intermittent appearance of substantial transient voltages in windings 21, 22 and 23 and in the impression of corresponding voltages on circuit 7 through winding 25. Any transient voltage impressed on capacitor 11 results in the capacitor becoming charged with stored energy and, upon disappearance of the transient voltage, the capacitor discharges in an oscillatory manner through coil 9 and winding 25 with a frequency of oscillation which is of the order of magnitude of the normal operating frequency of circuit 7.

If these transient oscillations exceed a predetermined magnitude, capacitor 11 supplies to winding 25 sufficient energy to cause commutation between the anodes connected with the two ends of one of windings 21, 22 and 23. At the same time these oscillations result in the selective impression on the two groups of grids 34 of potential components of the same frequency and of proper phase from circuit 7 through capacitor 39, resistor 41, contacts 57c, transformer 36 and the contacts of relay 37. Normal operation of converter 5 for the transfer of energy from circuit 6 to circuit 7 is thereby established, the different valves 27 being rendered conductive in sequence by the joint action of the positive potential component impressed on grids 34 from voltage divider 48 and of the alternating potential components impressed on the grids from transformer 36 to convert the current supplied thereto from winding 19 into current impulses supplied sequentially to the different portions of windings 21, 22 and 23 as is well known.

During the above described starting operation, relay 62 is energized from circuit 43 through contacts 58b, 56b. If normal operation of converter 5 is established within a time shorter than the operating time of relay 62, transformer 36 is energized at the frequency of circuit 7 and current flows from transformer 36 through the contacts of relay 37, resistors 38, grids 34, cathode 33, resistor 28, contacts 49c, voltage divider 48 and coil 56a back to transformer 36. Relay 56 then operates to open contacts 56b, thereby deenergizing relay 62 which returns to the position shown without closing contacts 62b. Relay 56 also closes contacts 56c, thereby connecting coil 30a with rectifier 47 to cause switch 30 to short circuit resistor 28. Relay 56 further opens contacts 56d inserted in the connections between coil 49a and rectifier 47, and relay 49 returns to the position shown when the current supplied to coil 49a by capacitor 52 has decreased to a sufficient extent.

Return of relay 49 to the position shown removes from the grid circuits the pulsating voltage drop in a portion of resistor 28 and the positive potential component impressed on the grids from voltage divider 48. Closure of contacts 49b substitutes for this positive potential component a negative potential component from voltage divider 48, which cooperates with the alternating potential components impressed on the grids from transformer 36 for decreasing the conductivity of valves 27 during normal operation of the converter. Resistor 51 is provided to prevent opening of the grid circuits during return of relay 49 to the position shown.

If relay 49 returns to the position shown before normal operation of converter 5 is established, the flow of current through valves 27 is interrupted by reapplication of a negative potential component on grids 34 and coil 49a is reenergized by closure of contacts 49d to cause relay 49 to initiate another series of current impulses through valves 27 in the manner above set forth. Initiation of the operation of the converter is thereby established more readily than if an uninterrupted series of impulses were supplied to valves 27.

If the starting operation is unsuccessful or requires such a length of time that relay 62 closes contacts 62b before relay 56 operates, alarm device 63 and trip coil 18a are energized and switch 18 disconnects transformer 16 from circuit 6 so as to permit investigation of the cause of failure of the system to operate.

If during normal operation of converter 5, the flow of current therethrough is interrupted for any reason, transformer 36 is deenergized and relay 56 returns to the position shown, thereby causing relay 49 to operate in the manner above set forth to reinitiate the operation of the converter.

During normal operation of the converter, winding 25 supplies to coil 9 current of relatively high frequency serving to heat billet 64 by induction of current therein. If billet 76 is then inserted in coil 13 in heating relation therewith so as to actuate relay 78, load switch 12 closes to cause winding 25 to supply current to coil 13 to heat billet 76 by induction of current therein. Actuation of relay 78 by billet 76 while relay 74 is maintained in the actuated position by billet 64 has no effect on the operation of the converter.

When billet 64, for example, reaches the desired temperature for which relay 75 is adjusted, the relay connects the coil of magnet valve 71 with circuit 43. The magnet valve admits fluid under pressure from reservoir 67 to motor 66, which moves billet 64 out of heating relation with coil 9. During the movement of billet 64 the billet ceases to engage thermocouple 73, which returns to ambient temperature. The time delay element of relay 75 causes magnet valve 71 to remain actuated during a sufficient length of time to insure completion of the stroke of motor 66.

Thermocouple 73 and relay 74 return to the position shown to cause switch 8 to open without otherwise affecting the operation of the system as long as another billet remains in heating position in one of the inductor coils. If all the billets are simultaneously withdrawn from the inductor coils, relays 74, 78 and any other similar relays cause all the load switches to open, relays 56, 58 and 37 to return to the position shown and relays 46 and 57 to operate to stop the normal operation of converter 5 to reestablish the heating operation of valves 27 above described. The relays interlock the grid energizing means for controlling the conductivity of valves 27 for the flow of heating current through circuit 26 and the grid energizing means for controlling the transfer of energy from circuit 6 to circuit 7 to prevent simultaneous operation thereof.

If switch 61 is returned to the position shown in engagement with contact 61b, relays 37, 46, 49, 56, 58 are returned or maintained in the position shown. Coil 57a is again energized and relay 57 operates to short circuit the primary winding of transformer 36 through contacts 57b, thereby immediately deenergizing transformer 36 regardless of the energization of circuit 7 to stop the operation of the converter.

If switch 61 is moved to engage contacts 61c a permanent connection is established therethrough between circuit 43 and coil 58a. Relay 58 then establishes the connections for starting and maintaining the operation of the converter for the conversion of energy from circuit 6 to circuit 7 in the manner above set forth.

If switch 61 is moved to engage contact 61d a permanent connection is established therethrough between circuit 43 and coil 46a. Relay 46 connects grids 34 with phase shifter 44 to establish the flow of heating current through valves 27 in the manner above set forth.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for heating simultaneously a plurality of objects electrically, the combination of a plurality of heating devices, a source of current, a current converting system connected with said source for converting current from said source into heating current to be supplied to said devices, means for severally connecting said devices with said converting system, and a plurality of means severally associated with the different said devices and responsive to relative movement of one of said objects and of any of said devices into heating relation for initiating operation of said current converting system.

2. In a system for heating simultaneously a plurality of objects electrically, the combination of a plurality of heating devices, a source of current, a current converting system connected with said source for converting current from said source into heating current to be supplied to said devices, means for severally connecting said devices with said converting system, and a plurality of means severally associated with the different said devices and jointly acting responsive to relative movement of all said objects and all said devices out of heating relation for stopping operation of said current converting system.

3. In a system for heating an object electrically, the combination of a heating device, a source of heating current, means for connecting said device with said source, a yieldably supported temperature responsive means disposed adjacent said device to be engaged by said object upon movement of said object into heating relation with said device, means actuated by said object through said temperature responsive means for controlling the operation of said connecting means, and means controlled by said temperature responsive means for controlling the relative position of said object and of said device.

4. In a system for simultaneously heating a plurality of objects electrically, the combination of a plurality of heating stations each comprising a heating device and movable means responsive to relative movement of the associated said device and of one of said objects into heating relation, a source of current, a converter connected with said source for converting current from said source into heating current for said devices, means for severally connecting the different said devices with said converter, and means responsive to operation of any of said movable means for rendering said converter operative to supply heating current to said devices.

5. In a system for simultaneously heating a plurality of objects electrically, the combination of a plurality of heating stations each comprising a heating device and movable means responsive to relative movement of the associated said device and of one of said objects out of heating relation, a source of current, a converter connected with said source for converting current from said source into heating current for said devices, means for severally connecting the different said devices with said converter, and means responsive to operation of all said movable means for rendering said converter inoperative for the supply of current to said devices.

6. In a system for simultaneously heating a plurality of objects electrically, the combination of a plurality of heating stations, each said station comprising a heating device, a movable temperature responsive device, movable means actuable by one of said objects through the associated said temperature responsive device into a first position in response to relative movement of the associated said heating device and of one of said objects into heating relation and into a second position in response to relative movement of the associated said heating device and of one of said objects out of heating relation, and means responsive to heating of the associated said temperature responsive device to a predetermined temperature for causing relative movement of the associated said heating device and of one of said objects out of heating relation, a source of current, a converter connected with said source for converting current from said source into heating current for said devices, means for severally connecting the different said devices with said converter, and means responsive to movement of any of said movable means into said first position for rendering said converter operative to supply current to said devices and responsive to movement of all said movable means into said second position for rendering said converter inoperative.

7. In a system for simultaneously heating a plurality of objects electrically, the combination of a plurality of heating stations each comprising a heating device and a switch operable into the open position in response to relative movement of the associated said device and of one of said objects into heating relation, a source of current, a converter connected with said source for converting current from said source into heating current for said devices, means for severally connecting the different said devices with said converter, and control means for rendering said converter operative comprising a circuit connecting the different said switches in series.

8. In a system for simultaneously heating a plurality of objects electrically, the combination of a plurality of heating stations each comprising a heating device and a switch operable into the open position in response to relative movement of the associated said device and of one of said objects out of heating relation, a source of current, a converter connected with said source for converting current from said source into heating current for said devices, means for severally connecting the different said devices with said converter, and control means for rendering said converter operative comprising a circuit connecting the different said switches in parallel.

9. In a system for heating an object electrically, the combination of a heating device, a source of current, switching means for connecting said device with said source, a movable temperature responsive device disposed adjacent said heating device, means actuated by said object through said temperature responsive device in response to relative movement of said heating device and of said object into heating relation for causing closure of said switching means, means for maintaining said temperature responsive device in contact with said object during heating thereof by said heating device, and means responsive to heating of said temperature responsive device to a predetermined temperature for causing relative movement of said heating device and of said object out of heating relation.

10. In a system for heating an object electrically, the combination of a heating device, a source of current, a converter connected with said source for converting current from said source into heating current for said heating device, means for connecting said heating device with said converter, a movable temperature responsive device disposed adjacent said heating device, means actuated by said object through said temperature responsive device in response to relative movement of said heating device and of said object into heating relation for rendering said converter operative to supply current to said heating device, means for maintaining said temperature responsive device in contact with said object during heating thereof by said heating device, and means responsive to heating of said temperature responsive device to a predetermined temperature for causing relative movement of said heating device and of said object out of heating relation.

LAUREN L. JOHNSON.

REFERENCES CITED

The following references are of record in the file of this patent:

UNITED STATES PATENTS

| Number | Name | Date |
|---|---|---|
| 1,081,164 | Solomon | Dec. 9, 1913 |
| 1,557,387 | Thwing | Oct. 13, 1925 |
| 1,736,865 | Starr | Nov. 26, 1929 |
| 1,878,458 | Blanchet | Sept. 20, 1932 |
| 1,985,805 | Spire | Dec. 25, 1934 |
| 2,122,941 | Hufler et al. | July 5, 1938 |
| 2,277,564 | Somes | Mar. 24, 1942 |
| 2,293,533 | Denneen et al. | Aug. 18, 1942 |
| 2,324,068 | Crandell | July 13, 1943 |
| 2,324,525 | Mittlemann | July 20, 1943 |
| 2,354,190 | Benkert | July 25, 1944 |
| 2,363,536 | Leathers | Nov. 28, 1944 |
| 2,363,719 | Cooper et al. | Nov. 28, 1944 |

FOREIGN PATENTS

| Number | Country | Date |
|---|---|---|
| 260,026 | Great Britain | 1926 |
| 117,663 | Australia | Nov. 4, 1943 |